United States Patent
Taira

(10) Patent No.: US 11,353,844 B2
(45) Date of Patent: Jun. 7, 2022

(54) INFORMATION PROCESSING APPARATUS

(71) Applicant: Fanuc Corporation, Yamanashi (JP)

(72) Inventor: Ryousuke Taira, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 28 days.

(21) Appl. No.: 16/707,703

(22) Filed: Dec. 9, 2019

(65) Prior Publication Data

US 2020/0192329 A1 Jun. 18, 2020

(30) Foreign Application Priority Data

Dec. 14, 2018 (JP) .............................. JP2018-234362

(51) Int. Cl.
| | | |
|---|---|---|
| *G05B 19/408* | (2006.01) | |
| *G05B 19/4063* | (2006.01) | |
| *G05B 19/4093* | (2006.01) | |
| *G05B 19/4068* | (2006.01) | |

(52) U.S. Cl.
CPC ..... *G05B 19/4083* (2013.01); *G05B 19/4063* (2013.01); *G05B 19/4068* (2013.01); *G05B 19/40937* (2013.01); *G05B 2219/34394* (2013.01)

(58) Field of Classification Search
None
See application file for complete search history.

(56) References Cited

U.S. PATENT DOCUMENTS

| | | | | |
|---|---|---|---|---|
| 5,453,933 A | * | 9/1995 | Wright ................. | G05B 19/414 700/181 |
| 8,302,075 B1 | * | 10/2012 | Blas, Jr. ................ | G06F 3/0481 717/113 |
| 10,684,830 B2 | * | 6/2020 | Mimlitch, III ...... | G06F 11/3664 |
| 2007/0198678 A1 | * | 8/2007 | Dieberger .......... | H04L 41/0893 709/223 |
| 2008/0033591 A1 | * | 2/2008 | Lankalapalli ........ | G05B 19/409 700/173 |
| 2014/0250362 A1 | * | 9/2014 | Blas, Jr ................. | G06F 3/0484 715/234 |
| 2014/0250422 A1 | * | 9/2014 | Bank ........................ | G06F 8/34 717/109 |
| 2014/0337715 A1 | * | 11/2014 | Madden ................ | G06F 40/143 715/236 |
| 2016/0214256 A1 | | 7/2016 | Hiruma | |
| 2017/0123766 A1 | * | 5/2017 | Childs ...................... | G06F 8/34 |

FOREIGN PATENT DOCUMENTS

| | | |
|---|---|---|
| JP | 2000089813 A | 3/2000 |
| JP | 2005135095 A | 5/2005 |
| JP | 2009080591 A | 4/2009 |
| JP | 2016137542 A | 8/2016 |

OTHER PUBLICATIONS

Japanese Decision to Grant a Patent for Japanese Application No. 2018-234362, dated Nov. 30, 2021 with translation, 5 pages.

* cited by examiner

Primary Examiner — Mohammad Ali
Assistant Examiner — David Earl Ogg
(74) Attorney, Agent, or Firm — RatnerPrestia

(57) ABSTRACT

The information processing apparatus analyzes a machining program, determines whether or not there is a block fulfilling conditions for grouping that are registered in advance in the machining program, and if present, specifies the range of blocks to be grouped according to the grouping conditions, and performs simplified display for the plurality of consecutive blocks that have been grouped on a screen.

4 Claims, 3 Drawing Sheets

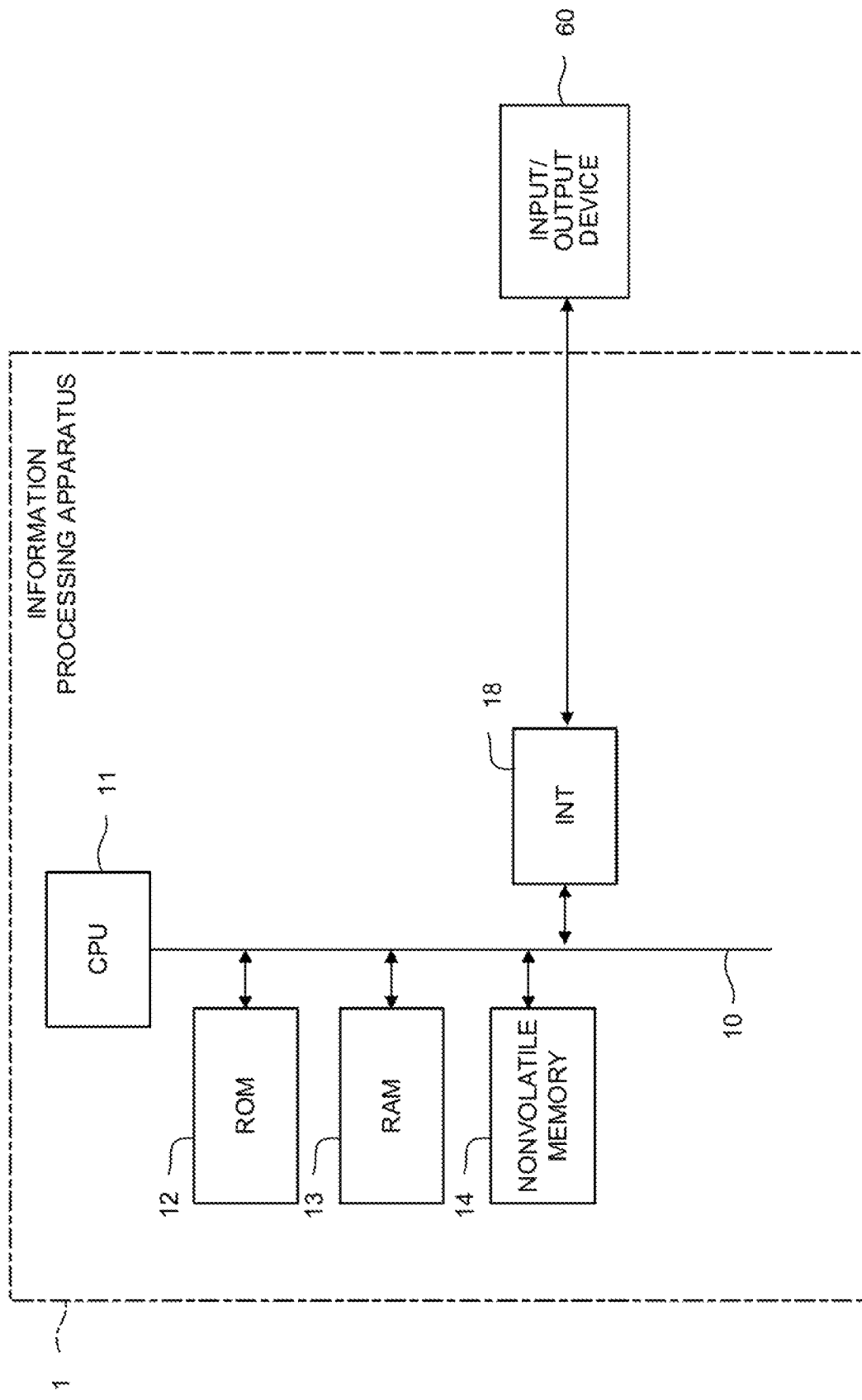

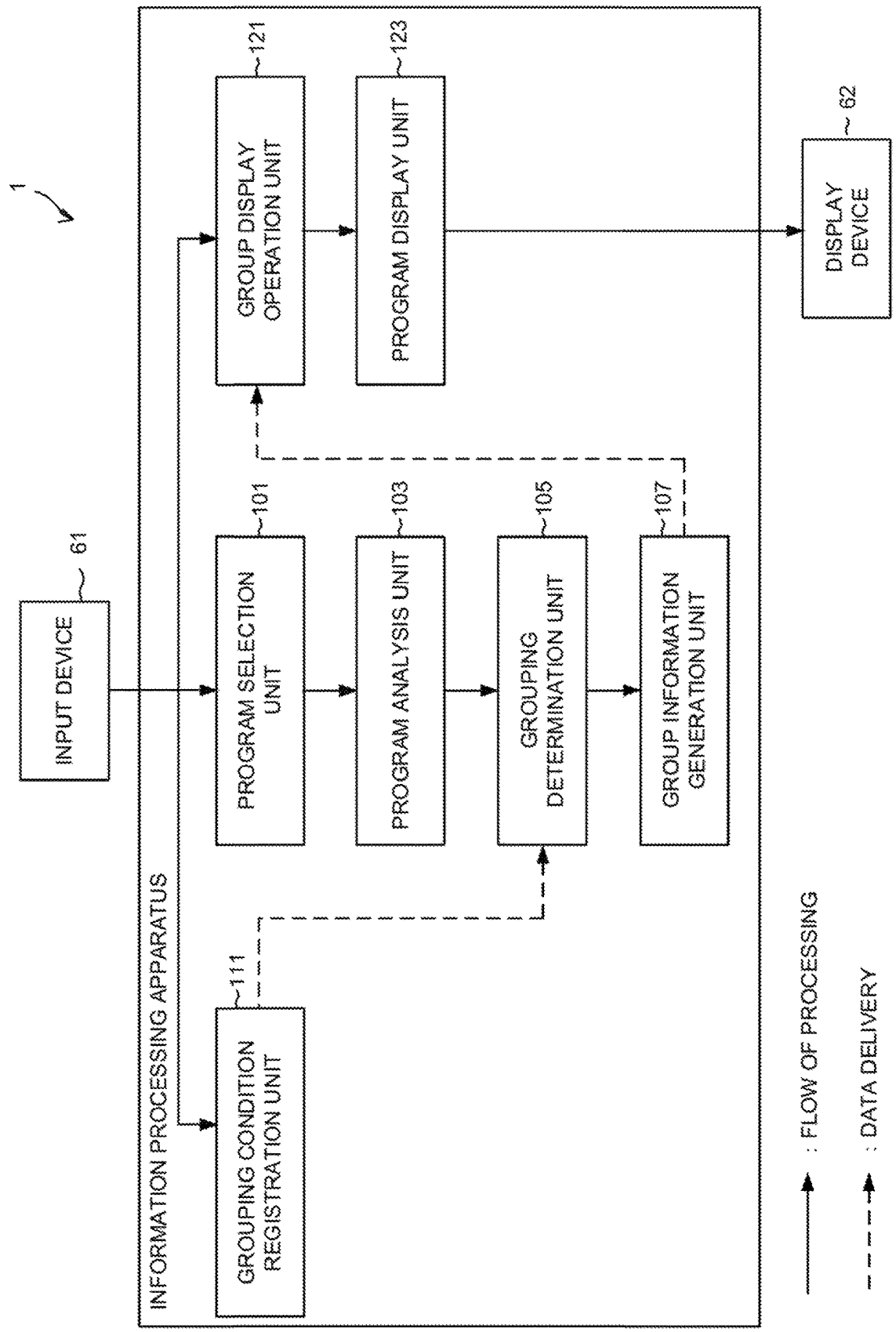

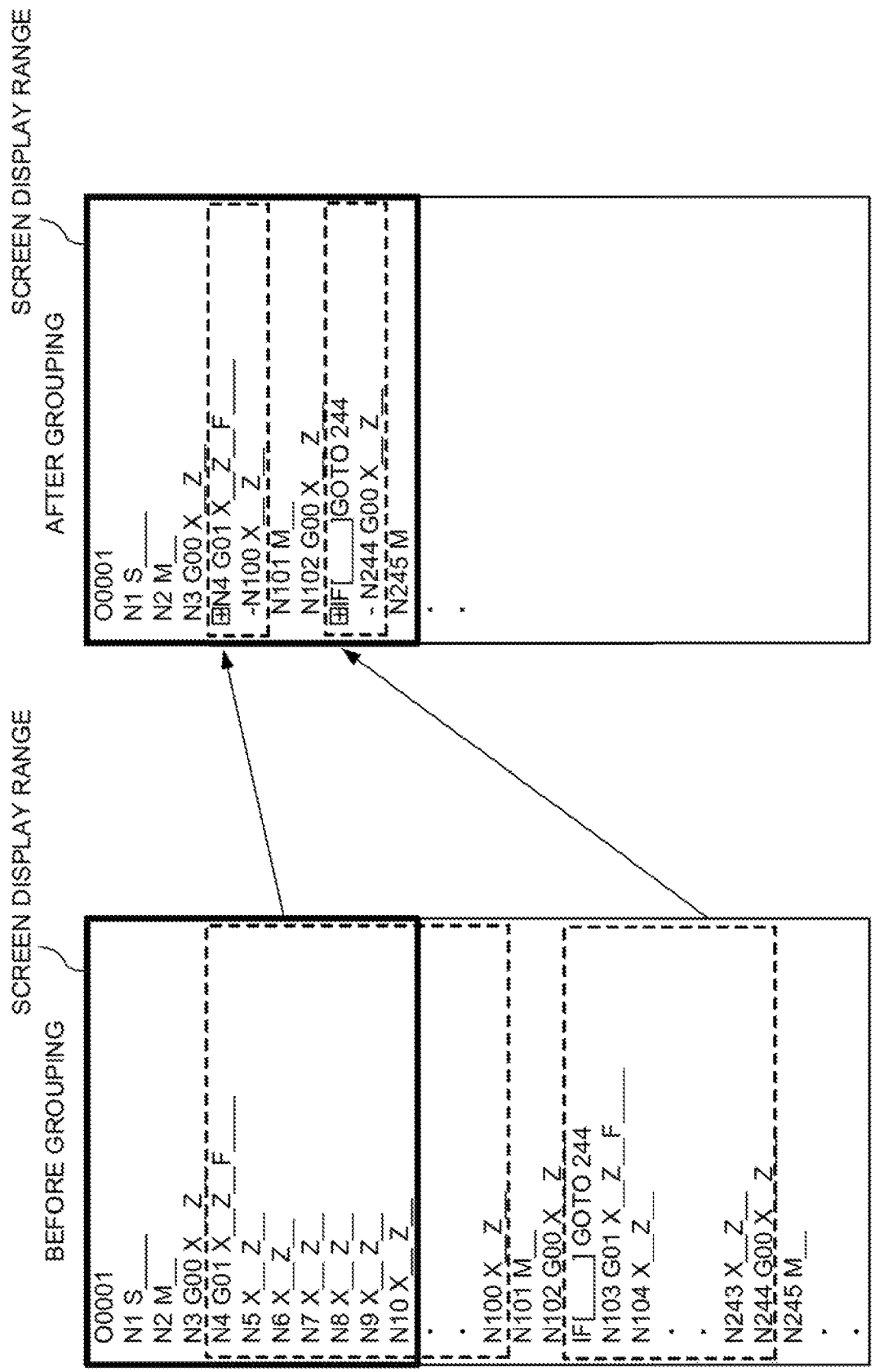

INFORMATION PROCESSING APPARATUS

RELATED APPLICATIONS

The present application claims priority to Japanese Patent Application Number 2018-234362 filed Dec. 14, 2018, the disclosure of which is hereby incorporated by reference herein in its entirety.

BACKGROUND OF THE INVENTION

1. Field of the Invention

The present invention relates to an information processing apparatus, and more particularly, to an information processing apparatus having a block grouping function on a machining program display screen.

2. Description of the Related Art

Information processing apparatuses for creating, editing, and displaying a machining program used by a numerical controller for controlling an industrial machine (machine tool or the like) to perform machining have been widely used. Typically, a numerical controller having a display device or an input device, a personal computer (PC), or the like have been used as the information processing apparatus.

The machining program tends to increase the total number of blocks, especially when it performs highly accurate machining. In creating, editing, and confirming a machining program, such a long machining program has low visibility, and the number of input operations until a desired block is displayed on a screen increases. In order to solve such a problem, it is desired that a plurality of blocks be automatically grouped so that switching between display and non-display is enabled.

Some integrated development environments for creating, editing, and displaying general-purpose computer programs have a function of grouping a part of source code for each unit and switching between display and non-display.

Some information processing apparatuses for creating, editing, and displaying a machining program provide a unique grouping function according to characteristics of the machining program. For example, Japanese Patent Application Laid-Open No. 2018-089813 discloses a method of grouping machining programs for each predefined process and displaying them in a tree.

However, in the method described in Japanese Patent Application Laid-Open No. 2018-089813, it is necessary for a user himself or herself to predefine the process manually. That is, a conventional information processing apparatus does not have a function of determining a grouping unit by which the machining programs are grouped.

SUMMARY OF THE INVENTION

The present invention is for solving such a problem, and an object thereof is to provide an information processing apparatus having a block grouping function on a machining program display screen.

The information processing apparatus according to the present invention that performs simplified display by grouping a plurality of consecutive blocks in a machining program. The information processing apparatus includes a grouping condition registration unit that holds conditions for the grouping in advance, a grouping determination unit that analyzes the machining program and groups the plurality of consecutive blocks based on the conditions, and a group display operation unit that performs the simplified display for the plurality of consecutive blocks that have been grouped.

The condition may relate to modal information, and the grouping determination unit may group a plurality of consecutive blocks for which the predetermined modal information is valid.

The condition may relate to a macro sentence, and the grouping determination unit may group a plurality of consecutive blocks included in a specified range of the predetermined macro sentence.

The condition may include block range specification, and the grouping determination unit may group a plurality of consecutive blocks specified in the range.

By providing the above-described configuration, the present invention can provide an information processing apparatus having a block grouping function on a machining program display screen.

BRIEF DESCRIPTION OF THE DRAWINGS

FIG. 1 is a diagram illustrating a hardware configuration example of an information processing apparatus;

FIG. 2 is a diagram illustrating a functional configuration example of the information processing apparatus; and FIG. 3 is a diagram illustrating an operation example of the information processing apparatus.

DETAILED DESCRIPTION OF THE PREFERRED EMBODIMENTS

FIG. 1 is a schematic hardware configuration diagram illustrating a main part of an information processing apparatus 1 according to an embodiment.

The information processing apparatus 1 includes a CPU 11, a ROM 12, a RAM 13, a nonvolatile memory 14, a bus 10, and an interface 18. An input/output device 60 is connected to the information processing apparatus 1. The information processing apparatus 1 is typically a PC or a numerical controller.

The CPU 11 is a processor that controls the information processing apparatus 1 as a whole. The CPU 11 reads a system program stored in the ROM 12 via the bus 10 and controls the entire information processing apparatus 1 according to the system program.

The ROM 12 stores system programs in advance. The RAM 13 temporarily stores temporary calculation data and display data, data and programs input by an operator via the input/output device 60, and the like.

The nonvolatile memory 14 is backed up by a battery (not shown), for example, and maintains a storage state even when the information processing apparatus 1 is powered off. The nonvolatile memory 14 stores data, programs, and the like input from the input/output device 60. The program and data stored in the nonvolatile memory 14 may be expanded on the RAM 13 at the time of execution and use.

The input/output device 60 is a data input/output device including a display, hardware keys, and the like, and is typically a keyboard, a display, an MDI, or an operation panel. The input/output device 60 displays information received from the CPU 11 via the interface 18 on the display. The input/output device 60 passes commands and data input from a keyboard or the like to the CPU 11 via the interface 18.

FIG. 2 is a block diagram showing a characteristic functional configuration of the information processing apparatus 1.

The information processing apparatus 1 includes a program selection unit 101, a program analysis unit 103, a grouping determination unit 105, a group information generation unit 107, a grouping condition registration unit 111, a group display operation unit 121, and a program display unit 123. In addition, an input device 61 and a display device 62 are connected to the information processing apparatus 1.

Hereinafter, operations of the above-described units of the information processing apparatus 1 will be described in time series.

(1) Registering Grouping Conditions

The grouping condition registration unit 111 accepts a grouping condition input by the user via the input device 61 such as a keyboard and registers it in a storage area (not shown). The grouping condition defines a condition for grouping a plurality of consecutive blocks in the machining program. For example, the presence of declarations of modal information and macro sentences (such as conditional branches and repeated instructions) can be used as a grouping condition. In this case, a plurality of consecutive blocks in which the declared modal information is valid and blocks included in the specified range of the declared macro sentence (conditional branches, repeated instructions, and the like) are targeted for grouping.

As an example, a user may be provided with a setting screen in which modal information and a type of macro sentence, which are objects to be grouped, can be selected by check boxes.

(2) Machining Program Analysis

The program selection unit 101 selects a machining program to be input, edited, and displayed. The program analysis unit 103 analyzes the content of the machining program selected by the program selection unit 101, and determines whether or not a block fulfilling the condition for grouping that is registered by the grouping condition registration unit 111 exists in the machining program. For example, it is determined whether or not a block in which modal information or a macro sentence is declared exists in the machining program.

(3) Group Determination

In the above (2), when a block fulfilling the condition for grouping is found in the machining program, the grouping determination unit 105 specifies a range of blocks to be grouped according to the condition. For example, when modal information or macro sentences are grouping conditions, a plurality of consecutive blocks in which modal information is valid or a plurality of consecutive blocks included in the specified range of a macro sentence (such as conditional branches or repeated instructions) are specified and its start block and end block are specified. When there are a plurality of locations fulfilling the condition for grouping in the machining program, the same processing is performed for each location.

(4) Generating Group Information

The group information generation unit 107 records the range of blocks to be grouped specified in (3) above as group information in a storage area (not shown). The group information can include, for example, the start block number of the group (sequence number of the start block), the end block number (sequence number of the end block), or the number of blocks from the start block to the end block. Further, additional information indicating group attributes and the like such as modal information may be included. When there are a plurality of groups, the same processing is performed for each group.

(5) Group Display Operation

The program display unit 123 displays the content of the machining program that has been selected and variously processed in (1) to (4) above on the screen of the display device 62. At this time, the group display operation unit 121 performs the following processing according to the group information generated in (4) above.

Display/Non-display of Grouped Blocks

The group display operation unit 121 performs switching between display and non-display of the plurality of consecutive blocks that have been grouped. FIG. 3 shows an example of display/non-display switching processing.

In FIG. 3, a dotted frame indicates the plurality of consecutive blocks that have been grouped, and a bold frame indicates a screen display range. The left diagram in FIG. 3 shows a case where the plurality of consecutive blocks that have been grouped are displayed on the screen as they are (display mode). The right diagram of FIG. 3 shows a case where the plurality of consecutive blocks that have been grouped are convolved and displayed together in one or several lines (non-display mode). In the non-display mode, the display of blocks between the start block and the end block of the group is omitted. That is, it is displayed in a simplified manner. In addition, it is indicated by an icon (+mark at the beginning of the line of the start block) that there are omitted blocks. The group display operation unit 121 can switch between the display mode and the non-display mode by detecting that this icon has been selected by the user, for example.

Specifically, in the right diagram of FIG. 3, blocks N4 to N100 are grouped based on the modal information "G01". Accordingly, a long machining program that repeats a minute movement command can be displayed short. Also, blocks N103 to N244 are grouped based on the macro sentence "IF . . . " in the conditional branches.

Display of Group Information

The group display operation unit 121 can display the group range so as to be visible by a method such as making the background color of the portion in the dotted frame shown in FIG. 3 different from the other portions.

Further, the group display operation unit 121 can display group information (start block number, end block number, number of blocks, additional information such as modal information) on the screen in accordance with a user operation. For example, when the user selects a portion within the dotted frame, the group information is displayed at a predetermined position on the screen.

According to the present embodiment, the information processing apparatus 1 analyzes a machining program in advance and groups a plurality of consecutive blocks in units such as modal information and macro sentences. Then, means for switching display and non-display of the grouped blocks when the machining program is displayed on the screen is provided. Accordingly, the visibility and operability in the confirmation/edition work of the machining program are improved. In particular, by performing grouping in units such as modal information and macro sentences, which are unique grouping units in the numerical control (NC) field, efficient handling of machining programs that tend to be long is enabled. As a result, the burden on the user is reduced, and errors in inputting, editing, and confirming the machining program are reduced, thereby contributing to prevention of malfunction of the industrial machine.

In addition, the present invention is not limited to the above-mentioned embodiment, and may be modified as appropriate within a range not impairing the gist of the invention. For example, in the above-described embodiment, the grouping conditions registered by the grouping condition registration unit 111 are general conditions applicable to any machining program such as the presence of modal information or the declaration of a macro sentence (conditional branches, repeated instructions, and the like). However, the present invention is not limited thereto, and may be configured such that, for example, the block range to be grouped may be directly specified by specifying a block number. Specifically, in addition to the start block number of the group, specification of the end block number or the number of blocks from the start block to the end block can be accepted.

The invention claimed is:

1. An information processing apparatus that performs simplified screen display by grouping a plurality of consecutive blocks in a machining program, the apparatus comprising:
    a grouping condition registration unit that receives, from a user, and retains conditions including modal information for applying the grouping of the consecutive blocks of the machining program in advance;
    a grouping determination unit that analyzes the machining program to determine whether the machining program contains the plurality of consecutive blocks and specifies a range of blocks to be grouped based on the conditions registered in advance in the group condition registration unit; and
    a group display operation unit that performs switching between a display mode and a non-display mode within a same area of a display screen for the simplified display of the machining program for the plurality of consecutive blocks in the specified range that have been grouped in accordance with the registered conditions,
    wherein in the non-display mode the grouped plurality of consecutive blocks are combined into a reduced number of lines
    to provide the simplified screen display such that a display of blocks between a start block and an end block of the grouped plurality of consecutive blocks of the machining program is not visible to the user on the simplified screen display.

2. The information processing apparatus according to claim 1, wherein the grouping determination unit groups a plurality of consecutive blocks for which the predetermined modal information is valid.

3. The information processing apparatus according to claim 1, wherein the condition relates to a macro sentence, and the grouping determination unit groups a plurality of consecutive blocks included in a specified range of the predetermined macro sentence.

4. The information processing apparatus according to claim 1, wherein the condition includes block range specification, and the grouping determination unit groups a plurality of consecutive blocks specified in the range.

* * * * *